(12) United States Patent
Ayabe et al.

(10) Patent No.: US 10,246,563 B2
(45) Date of Patent: Apr. 2, 2019

(54) PHOTOSTABILIZER MASTER BATCH AND METHOD FOR MANUFACTURING SAME

(71) Applicant: ADEKA CORPORATION, Tokyo (JP)

(72) Inventors: Takashi Ayabe, Saitama (JP); Takashi Usui, Saitama (JP)

(73) Assignee: ADEKA CORPORATION, Tokyo (JP)

(*) Notice: Subject to any disclaimer, the term of this patent is extended or adjusted under 35 U.S.C. 154(b) by 0 days.

(21) Appl. No.: 15/563,265

(22) PCT Filed: Mar. 30, 2016

(86) PCT No.: PCT/JP2016/060434
§ 371 (c)(1),
(2) Date: Sep. 29, 2017

(87) PCT Pub. No.: WO2016/159103
PCT Pub. Date: Oct. 6, 2016

(65) Prior Publication Data
US 2018/0094108 A1 Apr. 5, 2018

(30) Foreign Application Priority Data
Mar. 30, 2015 (JP) .................................. 2015-068399

(51) Int. Cl.
C08J 3/22 (2006.01)
C08K 3/36 (2006.01)
C08K 5/17 (2006.01)
C08L 23/00 (2006.01)
C08L 101/00 (2006.01)
C08K 5/00 (2006.01)

(52) U.S. Cl.
CPC ................. C08J 3/226 (2013.01); C08J 3/22 (2013.01); C08K 3/36 (2013.01); C08K 5/005 (2013.01); C08K 5/17 (2013.01); C08L 23/00 (2013.01); C08L 101/00 (2013.01); C08J 2423/00 (2013.01)

(58) Field of Classification Search
CPC .... C08J 3/22; C08J 3/226; C08K 3/36; C08K 5/005; C08K 5/17
USPC ........................................ 523/210, 216, 220
See application file for complete search history.

(56) References Cited

U.S. PATENT DOCUMENTS

| 2002/0013390 A1 | 1/2002 | Gugumus |
| 2006/0100325 A1 | 5/2006 | Leite et al. |
| 2009/0088513 A1 | 4/2009 | Yukino et al. |
| 2010/0093899 A1 | 4/2010 | Saitou et al. |
| 2014/0378586 A1 | 12/2014 | Ayabe et al. |
| 2015/0158996 A1 | 6/2015 | Ayabe et al. |

(Continued)

FOREIGN PATENT DOCUMENTS

| JP | 60-184558 A | 9/1985 |
| JP | 04-238806 A | 8/1992 |
| JP | 11-255957 A | 9/1999 |

(Continued)

OTHER PUBLICATIONS

International Search Report for PCT/JP2016/060434 (PCT/ISA/210) dated Jul. 5, 2016.

(Continued)

Primary Examiner — Edward J Cain
(74) Attorney, Agent, or Firm — Birch, Stewart, Kolasch & Birch, LLP

(57) ABSTRACT

Provided are: a photostabilizer masterbatch in which the problems of the occurrence of blocking over time due to the effect of temperature fluctuations in the environment and the difficulty in handling due to the resulting solidification in aggregates are overcome; and a method of producing the same.

The photostabilizer masterbatch is obtained by adding and mixing 80 to 300 parts by mass of (B) a hindered amine compound represented by the following Formula (1) with respect to 100 parts by mass of (A) a silica produced by a wet process and subsequently further adding and mixing 5 to 50 parts by mass of (C) a silica produced by a dry process:

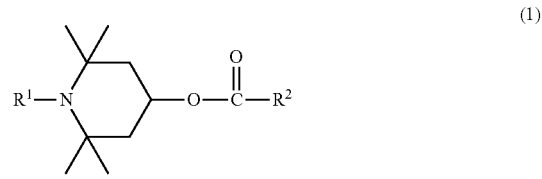

(1)

(wherein, $R^1$ represents a hydrogen atom, a hydroxy group, an alkyl, hydroxyalkyl, alkoxy or hydroxyalkoxy group having 1 to 30 carbon atoms, or an oxy radical; and $R^2$ represents an alkyl group having 1 to 30 carbon atoms, an alkenyl group having 2 to 30 carbon atoms, or a group represented by the following Formula (2))

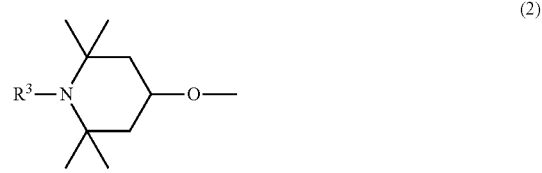

(2)

(wherein, $R^3$ represents the same as $R^1$ in the Formula (1)).

6 Claims, No Drawings

(56) References Cited

U.S. PATENT DOCUMENTS

2015/0353710 A1  12/2015  Ayabe et al.
2016/0237241 A1   8/2016  Ayabe et al.

FOREIGN PATENT DOCUMENTS

| JP | 2001-158823 A | 6/2001 |
| JP | 2005-534786 A | 11/2005 |
| JP | 2008-189822 A | 8/2008 |
| JP | 2010-280924 A | 12/2010 |
| JP | 2012-036398 A | 2/2012 |
| JP | 2014-141616 A | 8/2014 |
| WO | WO 2005/061613 A1 | 7/2005 |
| WO | WO 2007/000876 A1 | 1/2007 |
| WO | WO 2013/114652 A1 | 8/2013 |
| WO | WO 2014/010492 A1 | 1/2014 |
| WO | WO 2014/029344 A1 | 2/2014 |
| WO | WO 2015/079896 A1 | 6/2015 |

OTHER PUBLICATIONS

Written Opinion of the International Searching Authority for PCT/JP2016/060434 (PCT/ISA/237) dated Jul. 5, 2016.
Extended European Search Report dated Oct. 16, 2018 in European Patent Application No. 16772984.7.

PHOTOSTABILIZER MASTER BATCH AND METHOD FOR MANUFACTURING SAME

TECHNICAL FIELD

The present invention relates to a photostabilizer masterbatch and a method of producing the same (hereinafter, also simply referred to as "masterbatch" and "production method", respectively). More particularly, the present invention relates to improvement of a photostabilizer masterbatch comprising a silica and a photostabilizer and a method of producing the same.

BACKGROUND ART

Photostabilizers such as hindered amine compounds and ultraviolet absorbers are known to inhibit deterioration of organic materials, such as synthetic resins, caused by light.

Generally, a compound to be used as a photostabilizer is preferably one which has a high melting point and shows limited resin plasticization and evaporation from a resin. However, a photostabilizer having an excessively high molecular weight is restrained from moving in a resin and thus tends to exhibit a reduced stabilization effect.

For instance, hindered amine compounds obtained by reaction between a 2,2,6,6-tetramethylpiperidinol and a fatty acid are capable of imparting excellent weathering resistance despite having a low melting point. They are, however, easily liquefied due to their low molecular weights and, in the production of a masterbatch comprising such a hindered amine compound at a high concentration, there is a problem that the hindered amine compound bleeds out from the surface of the resulting masterbatch, making the surface sticky and causing blocking of the masterbatch.

As methods for improving the above-described problem in the ease of handling of a hindered amine compound-containing masterbatch, for example, there have been proposed a method of replacing a resin additive with one impregnated into a powdery inorganic material having an oil absorption of not less than 150 ml/100 g (Patent Document 1), a method of incorporating a nucleating agent (Patent Document 2), a method of incorporating a benzotriazole-based ultraviolet absorber (Patent Document 3), and a method of separately producing a hindered amine compound masterbatch and a benzoate compound masterbatch and subsequently mixing these masterbatches (Patent Document 4). Further, Patent Document 5 discloses a masterbatch in which a hindered amine compound, a benzoate compound and a benzotriazole-based ultraviolet absorber are incorporated.

RELATED ART DOCUMENTS

Patent Documents

Patent Document 1: WO 2007/000876
Patent Document 2: Japanese Unexamined Patent Application Publication No. 2008-189822
Patent Document 3: WO 2013/114652
Patent Document 4: WO 2014/010492
Patent Document 5: Japanese Unexamined Patent Application Publication No. 2014-141616

SUMMARY OF THE INVENTION

Problems to be Solved by the Invention

However, in those masterbatches produced by the methods described in Patent Documents 1 to 5, although the surface conditions are good immediately after the production, there is a problem that blocking occurs over time due to the effect of temperature fluctuations in the environment, causing the masterbatches to solidify in aggregates and making the handling thereof difficult; therefore, a further improvement is demanded.

In view of the above, an object of the present invention is to provide: a photostabilizer masterbatch in which the problems of the occurrence of blocking over time due to the effect of temperature fluctuations in the environment and the difficulty in handling due to the resulting solidification in aggregates are overcome; and a method of producing the same.

Means for Solving the Problems

The present inventors intensively studied to solve the above-described problems and consequently discovered that the problems can be solved by a masterbatch which is obtained by impregnating a hindered amine compound into a wet silica and subsequently further adding a specific silica thereto, thereby completing the present invention.

That is, the photostabilizer masterbatch of the present invention is characterized in that it is obtained by adding and mixing 80 to 300 parts by mass of (B) a hindered amine compound represented by the following Formula (1) with respect to 100 parts by mass of (A) a silica produced by a wet process and subsequently further adding and mixing 5 to 50 parts by mass of (C) a silica produced by a dry process:

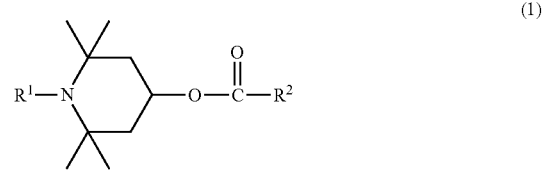

(1)

(wherein, $R^1$ represents a hydrogen atom, a hydroxy group, an alkyl, hydroxyalkyl, alkoxy or hydroxyalkoxy group having 1 to 30 carbon atoms, or an oxy radical; and $R^2$ represents an alkyl group having 1 to 30 carbon atoms, an alkenyl group having 2 to 30 carbon atoms, or a group represented by the following Formula (2))

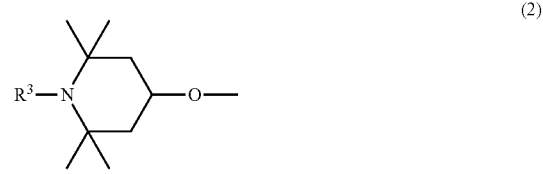

(2)

(wherein, $R^3$ represents the same as $R^1$ in the Formula (1)).

In the masterbatch of the present invention, it is preferred that the (A) silica produced by a wet process has a volume-average particle size in a range of 0.1 to 100 μm; and that the (C) silica produced by a dry process has an area-average particle size in a range of 1 to 100 nm.

The synthetic resin composition of the present invention (hereinafter, also simply referred to as "resin composition") is characterized in that it is obtained by incorporating the above-described photostabilizer masterbatch of the present invention into a synthetic resin such that the amount of the hindered amine compound of the component (B) is 0.01 to 10 parts by mass with respect to 100 parts by mass of the synthetic resin.

In the resin composition of the present invention, the synthetic resin is preferably a polyolefin resin.

The method of producing a photostabilizer masterbatch according to the present invention is characterized by comprising: a first mixing step of adding and mixing 80 to 300 parts by mass of (B) a hindered amine compound represented by the following Formula (1) with respect to 100 parts by mass of (A) a silica produced by a wet process; and a second mixing step of adding and mixing 5 to 50 parts by mass of (C) a silica produced by a dry process with the thus obtained mixture of the (A) silica produced by a wet process and the (B) hindered amine compound:

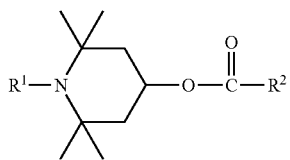

(1)

(wherein, $R^1$ represents a hydrogen atom, a hydroxy group, an alkyl, hydroxyalkyl, alkoxy or hydroxyalkoxy group having 1 to 30 carbon atoms, or an oxy radical; and $R^2$ represents an alkyl group having 1 to 30 carbon atoms, an alkenyl group having 2 to 30 carbon atoms, or a group represented by the following Formula (2))

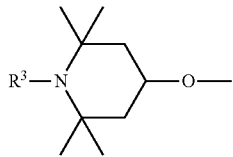

(2)

(wherein, $R^3$ represents the same as $R^1$ in the Formula (1)).

Effects of the Invention

According to the present invention, a photostabilizer masterbatch in which the problems of the occurrence of blocking over time due to the effect of temperature fluctuations in the environment and the difficulty in handling due to the resulting solidification in aggregates are overcome, and a method of producing the same can be realized.

MODE FOR CARRYING OUT THE INVENTION

The photostabilizer masterbatch of the present invention and the production method of the same will now be described in detail.

There are diverse types of silicas such as naturally-occurring silicas, synthetic silicas, crystalline silicas and amorphous silicas, and the silicas used in the present invention are synthetic amorphous silicas. Further, silicas are classified into wet silicas and dry silicas.

The (A) wet silica represents a silica obtained by a wet process and can be produced by a method of neutralizing a sodium silicate solution with a mineral acid (e.g., sulfuric acid, hydrochloric acid) or a method of hydrolyzing an alkoxysilane, and a precipitation method and a gelation method are known as general production methods. Examples of a silica produced by a precipitation method include NIPSIL (trade name) manufactured by Nippon Silica Industrial Co., Ltd., ULTRASIL® (trade name) manufactured by Evonik Industries AG, HI-SIL™ (trade name) manufactured by PPG Industries, Inc., ZEOSIL® (trade name) manufactured by Rhodia Ltd., TOKUSIL® (trade name) manufactured by Tokuyama Corporation, CARPLEX® (trade name) manufactured by DSL Japan Co., Ltd., and MIZUKASIL® (trade name) manufactured by Mizusawa Industrial Chemicals, Ltd. Examples of a silica produced by a gelation method include SYLYSIA® (trade name) manufactured by Fuji Silysia Chemical Ltd., SYLOID® (trade name) manufactured by W.R. Grace & Co., GASIL® (trade name) manufactured by Joseph Crosfield & Sons, Ltd., SILCRON® (trade name) manufactured by SCM Corporation, MIZUKASIL® (trade name) manufactured by Mizusawa Industrial Chemicals, Ltd., and NIPGEL (trade name) manufactured by Nippon Silica Industrial Co., Ltd.

The volume-average particle size of the (A) wet silica represents a 50% cumulative particle diameter which is determined in accordance with the ISO-13320 standard by allowing a mixture of water and the silica to be in a dispersed state by ultrasonication and measuring the volume particle size distribution by a laser diffraction-scattering method. A preferred volume-average particle size varies depending on the intended use of the resulting molded article; however, in the present invention, it is 0.1 to 100 μm, more preferably 1 to 50 μm. When the volume-average particle size is larger than this range, the dispersibility in a resin may be deteriorated and the physical properties of the resin may thus be impaired, whereas when the volume-average particle size is smaller than this range, dust generation is likely to occur and the working environment for the photostabilizer masterbatch production may consequently be deteriorated.

The (C) dry silica represents a silica obtained by a dry process and can be produced by degradation of silicon chloride carried out by a method of burning silicon chloride in oxygen or a hydrogen flame (burning method) or a method of bringing silicon chloride into contact with arc discharge or plasma discharge. Examples of the dry silica include AEROSIL® (trade name) manufactured by Nippon Aerosil Co., Ltd., REOLOSIL® (trade name) manufactured by Tokuyama Corporation and Cab-O-Sil® (trade name) manufactured by Cabot Corporation, and examples of a silica produced by an arc method include FRANSIL (trade name) manufactured by Fransil Co. and ARC SILICA (trade name) manufactured by PPG Industries, Inc.

In the present invention, the (C) dry silica may be polymerized including a metal and, for example, aluminosilicate (specifically, AEROSIL® 200, AEROSIL® 300, AEROSIL® 380 or the like (trade names) manufactured by Nippon Aerosil Co., Ltd.) can be used.

Since the (C) dry silica has a strong cohesive force, it is difficult to measure the volume-average particle size thereof by a laser diffraction-scattering method in accordance with the ISO-13320 standard. In the present invention, the average particle size of the dry silica represents an area-average particle size determined by applying a BET method to a nitrogen adsorption isotherm at the liquid nitrogen temperature.

In the present invention, the average particle size of the (C) dry silica is preferably 1 to 100 nm, more preferably 5 to 50 nm. When the average particle size is larger than 100 nm, the effects of the present invention may not be attained, whereas when the average particle size is smaller than 1 nm, it is difficult to disperse the (C) dry silica in a resin and this may lead to deterioration of the outer appearance of the resulting molded article.

In the present invention, the water content of the (A) wet silica and that of the (C) dry silica are preferably 0.1 to 7% by mass, more preferably 1 to 5% by mass. When the water contents of these silicas are less than 0.1% by mass, powder-form inorganic matters are electrically charged and aggregate, making the handling difficult in some cases, whereas when the water contents are higher than 7% by mass, a resin composition containing these silicas may be foamed at the time of molding. The water contents of these silicas can be easily adjusted by placing the silicas in a humidity-controlled environment, or by spraying water thereto or drying them in vacuum or using a heat source.

The (B) hindered amine compound used in the photostabilizer masterbatch of the present invention is a compound represented by the following Formula (1):

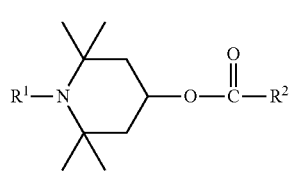
(1)

(wherein, $R^1$ represents a hydrogen atom, a hydroxy group, an alkyl, hydroxyalkyl, alkoxy or hydroxyalkoxy group having 1 to 30 carbon atoms, or an oxy radical; and $R^2$ represents an alkyl group having 1 to 30 carbon atoms, an alkenyl group having 2 to 30 carbon atoms, or a group represented by the following Formula (2))

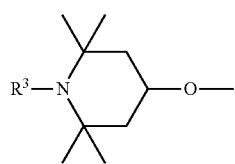
(2)

(wherein, $R^3$ represents the same as $R^1$ in the Formula (1)).

Examples of the alkyl group having 1 to 30 carbon atoms that is represented by $R^1$, $R^2$ and $R^3$ in the Formula (1) include methyl, ethyl, propyl, isopropyl, butyl, isobutyl, sec-butyl, tert-butyl, pentyl, sec-pentyl, tert-pentyl, hexyl, heptyl, octyl, isooctyl, 2-ethylhexyl, tert-octyl, nonyl, isononyl, decyl, undecyl, dodecyl, tridecyl, tetradecyl, pentadecyl, hexadecyl, heptadecyl, and octadecyl. $R^1$ and $R^2$ may be the same or different.

Examples of the hydroxyalkyl group having 1 to 30 carbon atoms that is represented by $R^1$ and $R^3$ in the Formula (1) include the above-described alkyl groups substituted with a hydroxy group, such as hydroxyethyl, 2-hydroxypropyl and 3-hydroxypropyl.

Examples of the alkoxy group having 1 to 30 carbon atoms that is represented by $R^1$ and $R^3$ in the Formula (1) include those alkoxy groups that correspond to the above-described alkyl groups, such as methoxy, ethoxy, propoxy, isopropoxy, butoxy, octoxy and 2-ethylhexyloxy.

Examples of the hydroxyalkoxy group having 1 to 30 carbon atoms that is represented by $R^1$ and $R^3$ in the Formula (1) include those hydroxyalkoxy groups that correspond to the above-described alkoxy groups, such as hydroxyethyloxy, 2-hydroxypropyloxy, 3-hydroxypropyloxy, 4-hydroxybutyloxy, 2-hydroxy-2-methylpropyloxy and 6-hydroxyhexyloxy.

Examples of the alkenyl group having 2 to 30 carbon atoms that is represented by $R^2$ in the Formula (1) include vinyl, propenyl, butenyl, hexenyl and oleyl. The double bond thereof may be located internally or at the α- or ω-position.

Examples of a specific structure of the hindered amine compound represented by the Formula (1) include those of the following Compound Nos. 1 to 9. It is noted here, however, that the present invention is not restricted thereto by any means. The "mixed alkyl groups" in Compound Nos. 7 and 8 means a mixture of hindered amine compounds of the Formula (1) wherein $R^2$ is an alkyl group having 15 to 17 carbon atoms, and the "mixed alkyl groups" in Compound No. 9 means a mixture of hindered amine compounds of the Formula (1) wherein $R^2$ is an alkyl group having 13 to 19 carbon atoms.

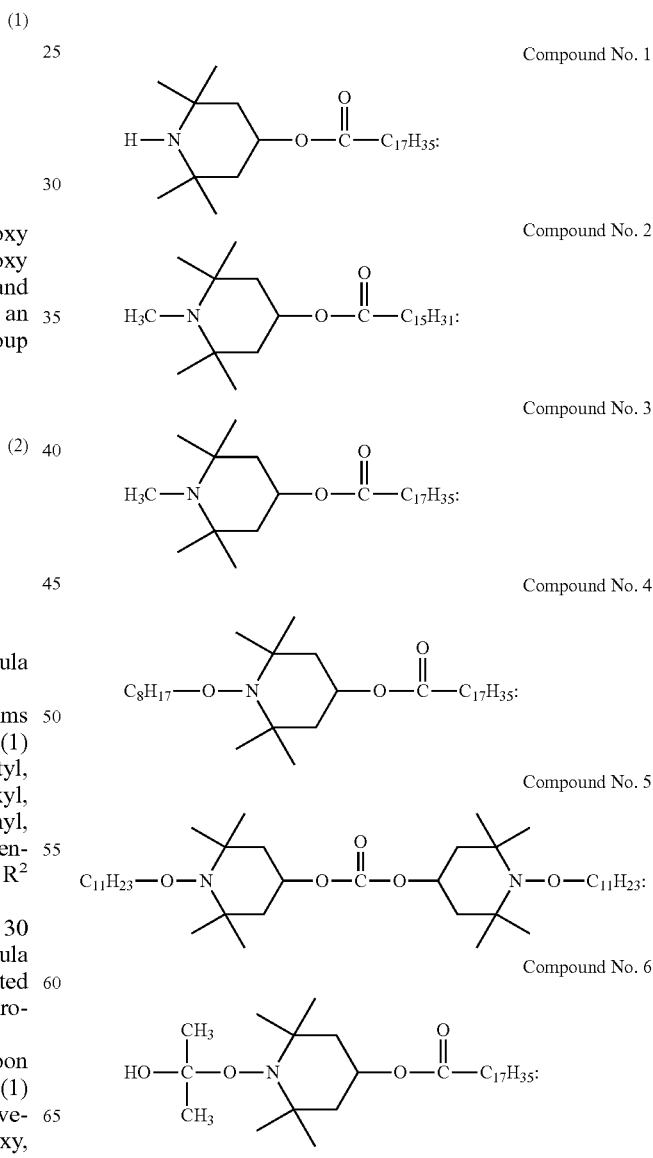

Compound No. 7

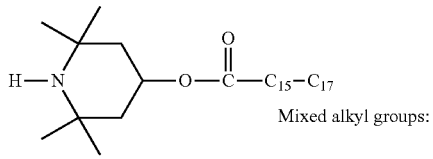

Mixed alkyl groups:

Compound No. 8

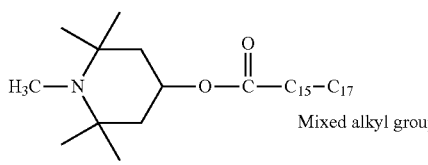

Mixed alkyl groups:

Compound No. 9

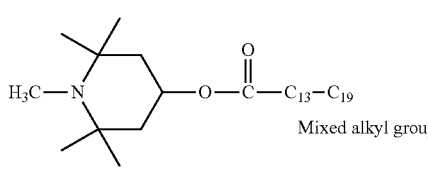

Mixed alkyl groups:

In the hindered amine compound represented by the Formula (1), $R^1$ is preferably a hydrogen atom or a methyl group, and $R^2$ is preferably a mixture of alkyl groups having 8 to 26 carbon atoms.

As a method of synthesizing the hindered amine compound represented by the Formula (1), a combination of a fatty acid having a prescribed number of carbon atoms and an alcohol having a 2,2,6,6-tetramethylpiperidinol skeleton may be allowed to react with each other and, for example, esterification can be performed by direct esterification between an acid and an alcohol, reaction between an acid halide and an alcohol, transesterification reaction or the like. As a purification method, for example, distillation, recrystallization, or a method using a filter medium or an adsorbent can be employed as appropriate.

In the photostabilizer masterbatch of the present invention, the amount of the (B) hindered amine compound to be incorporated is in a range of 80 to 300 parts by mass, preferably 90 to 200 parts by mass, with respect to 100 parts by mass of the (A) wet silica. When the amount of the (B) hindered amine compound is less than 80 parts by mass, the ratio of the silica, which is a filler, is high, so that the physical properties of the resin into which the photostabilizer masterbatch is incorporated may be deteriorated, whereas when the amount is greater than 300 parts by mass, the effects of the present invention may not be attained.

The photostabilizer masterbatch of the present invention is characterized in that it is obtained by adding and mixing 80 to 300 parts by mass of the (B) hindered amine compound with respect to 100 parts by mass of the (A) wet silica and subsequently further adding and mixing 5 to 50 parts by mass of the (C) dry silica, and the (C) dry silica is preferably added in an amount of 10 to 30 parts by mass. When the amount of the (C) dry silica is less than 5 parts by mass, the effects of the present invention may not be attained, whereas when the amount of the (C) dry silica is greater than 50 parts by mass, the filler ratio in the photostabilizer masterbatch is increased, so that the weight of a molded article obtained by incorporating the photostabilizer masterbatch into a synthetic resin and molding the resultant may be increased and the physical properties of the resin may be deteriorated. For the addition of the (B) hindered amine compound to the (A) wet silica, as required, the (B) hindered amine compound can be heat-melted into a liquid or fluid state.

In a synthetic resin composition obtained by incorporating the photostabilizer masterbatch of the present invention into a synthetic resin, resin additives that are usually and generally used can be incorporated in such a range that does not impair the effects of the present invention. Examples of such resin additives include a phenolic antioxidant, a phosphorus-based antioxidant, a thioether-based antioxidant, an ultraviolet absorber, a hindered amine-based photostabilizer other than the (B) hindered amine compound represented by the Formula (1), a nucleating agent, a flame retardant, a flame retardant aid, a lubricant, a filler, a metallic soap, a hydrotalcite, an antistatic agent, a pigment and a dye. These resin additives may be incorporated into the photostabilizer masterbatch of the present invention, or they may be added to a synthetic resin separately from the photostabilizer masterbatch of the present invention.

Examples of the phenolic antioxidant include 2,6-di-tert-butyl-4-ethylphenol, 2-tert-butyl-4,6-dimethylphenol, styrenated phenol, 2,2'-methylenebis(4-ethyl-6-tert-butylphenol), 2,2'-thiobis-(6-tert-butyl-4-methylphenol), 2,2'-thiodiethylenebis[3-(3,5-di-tert-butyl-4-hydroxyphenyl)propionate], 2-methyl-4,6-bis(octylsulfanylmethyl)phenol, 2,2'-isobutylidenebis(4,6-dimethylphenol), isooctyl-3-(3,5-di-tert-butyl-4-hydroxyphenyl)propionate, N,N'-hexane-1,6-diylbis[3-(3,5-di-tert-butyl-4-hydroxyphenyl)propionamide], 2,2'-oxamide-bis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylenebis(4,6-di-tert-butylphenol), esters of 3,5-bis(1,1-dimethylethyl)-4-hydroxy-benzenepropanoic acid and a C13-15 alkyl, 2,5-di-tert-amylhydroquinone, hindered phenol polymer (AO.OH.998 (trade name), manufactured by ADEKA Palmarole), 2,2'-methylenebis[6-(1-methylcyclohexyl)-p-cresol], 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 6-[3-(3-tert-butyl-4-hydroxy-5-methyl)propoxy]-2,4,8,10-tetra-tert-butylbenzo[d,f][1,3,2]-dioxaphosphepin, hexamethylene-bis[3-(3,5-di-tert-butyl-4-hydroxyphenyl)propionate], calcium bis[monoethyl(3,5-di-tert-butyl-4-hydroxybenzyl)phosphonate], a reaction product between 5,7-bis(1,1-dimethylethyl)-3-hydroxy-2(3H)-benzofuranone and o-xylene, 2,6-di-tert-butyl-4-(4,6-bis(octylthio)-1,3,5-triazine-2-ylamino)phenol, DL-α-tocophenol (vitamin E), 2,6-bis(α-methylbenzyl)-4-methylphenol, bis[3,3-bis-(4'-hydroxy-3'-tert-butyl-phenyl)butyric acid]glycol ester, 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl-3,5-di-tert-butyl-4-hydroxybenzyl thioacetate, thiodiethylene-bis[(3,5-di-tert-butyl-4-hydroxyphenyl) propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl)butyric acid]glycol ester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis

[methylene-3-(3',5'-di-tert-butyl-4'-hydroxyphenyl) propionate]methane, 2-tert-butyl-4-methyl-6-(2-acroyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-t etraoxaspiro[5.5]undecane, and triethylene glycol-bis[β-(3-tert-butyl-4-hydroxy-5-methylphenyl)propionate].

In cases where any of the above-exemplified phenolic antioxidants is used, it is used such that, when the photostabilizer masterbatch of the present invention is incorporated into a synthetic resin, the phenolic antioxidant is added in an amount of preferably 0.001 to 10 parts by mass, more preferably 0.01 to 0.5 parts by mass, with respect to 100 parts by mass of the synthetic resin.

Examples of the phosphorus-based antioxidant include triphenyl phosphite, diisooctyl phosphite, heptakis triphosphite, triisodecyl phosphite, diphenylisooctyl phosphite, diisooctylphenyl phosphite, diphenyltridecyl phosphite, triisooctyl phosphite, trilauryl phosphite, diphenyl phosphite, tris(dipropylene glycol)phosphite, diisodecylpentaerythritol diphosphite, dioleyl hydrogen phosphite, trilauryl trithiophosphite, bis(tridecyl)phosphite, tris(isodecyl)phosphite, tris(tridecyl)phosphite, diphenyldecyl phosphite, dinonylphenyl-bis(nonylphenyl)phosphite, poly(dipropylene glycol)phenyl phosphite, tetraphenyl dipropyl glycol diphosphite, trisnonylphenyl phosphite, tris(2,4-di-tert-butylphenyl)phosphite, tris(2,4-di-tert-butyl-5-methylphenyl)phosphite, tris[2-tert-butyl-4-(3-tert-butyl-4-hydroxy-5-methylphenylthio)-5-methylphenyl]phosphite, tri(decyl) phosphite, octyldiphenyl phosphite, di(decyl)monophenyl phosphite, distearyl pentaerythritol diphosphite, a mixture of distearyl pentaerythritol and calcium stearate, alkyl(C10) bisphenol-A phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetraphenyl-tetra(tridecyl)pentaerythritol tetraphosphite, bis (2,4-di-tert-butyl-6-methylphenyl)ethyl phosphite, tetra(tridecyl)isopropylidene diphenol diphosphite, tetra(tridecyl)-4,4'-n-butylidene-bis(2-tert-butyl-5-methylphenol) diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, (1-methyl-1-propanyl-3-ylidene)-tris(2-1,1-dimethylethyl)-5-methyl-4, 1-phenylene)hexatridecyl phosphite, 2,2'-methylene-bis(4,6-tert-butylphenyl)-2-ethylhexyl phosphite, 2,2'-methylene-bis(4,6-di-tert-butylphenyl)-octadecyl phosphite, 2,2'-ethylidene-bis(4,6-di-tert-butylphenyl)fluorophosphite, 4,4'-butylidene-bis(3-methyl-6-tert-butylphenylditridecyl) phosphite, tris(2-[(2,4,8,10-tetrakis-tert-butyldibenzo[d,f][1,3,2]dioxaphosphepin-6-yl)oxy]ethyl)amine, 3,9-bis(4-nonylphenoxy)-2,4,8,10-tetraoxa-3,9-diphosphaspiro[5,5]undecane, 2,4,6-tri-tert-butylphenyl-2-butyl-2-ethyl-1,3-propanediol phosphite, poly-4,4'-isopropylidene diphenol C12-15 alcohol phosphite, and phosphite of 2-ethyl-2-butylpropylene glycol and 2,4,6-tri-tert-butylphenol.

In cases where any of the above-exemplified phosphorus-based antioxidants is used, it is used such that, when the photostabilizer masterbatch of the present invention is incorporated into a synthetic resin, the phosphorus-based antioxidant is added in an amount of preferably 0.001 to 10 parts by mass, more preferably 0.01 to 0.5 parts by mass, with respect to 100 parts by mass of the synthetic resin.

Examples of the thioether-based antioxidant include tetrakis[methylene-3-(laurylthio)propionate]methane, bis (methyl-4-[3-n-alkyl(C12/C14)thiopropionyloxy]-5-tert-butylphenyl)sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-tert-butyl-m-cresol), and distearyl disulfide.

In cases where any of the above-exemplified thioether-based antioxidants is used, it is used such that, when the photostabilizer masterbatch of the present invention is incorporated into a synthetic resin, the thioether-based antioxidant is added in an amount of preferably 0.001 to 10 parts by mass, more preferably 0.01 to 0.5 parts by mass, with respect to 100 parts by mass of the synthetic resin.

Examples of the ultraviolet absorber include 2-hydroxybenzophenones, such as 2,4-dihydroxybenzophenone, 2-hydroxy-4-methoxybenzophenone, 2-hydroxy-4-octoxybenzophenone and 5,5'-methylene-bis(2-hydroxy-4-methoxybenzophenone); 2-(2-hydroxyphenyl)benzotriazoles, such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolylphenol), polyethylene glycol esters of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole and 2-[2-hydroxy-4-(3-methacryloyloxypropyl)phenyl]benzotriazole; 2-(2-hydroxyphenyl)-4,6-diaryl-1,3,5-triazines, such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12 to 13 mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine and 2,4,6-tris(2-hydroxy-3-methyl-4-hexyloxyphenyl)-1,3,5-triazine; benzoates, such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy)benzoate, octadecyl(3,5-di-tert-butyl-4-hydroxy)benzoate and behenyl (3,5-di-tert-butyl-4-hydroxy)benzoate; substituted oxanilides such as 2-ethyl-2'-ethoxyoxanilide and 2-ethoxy-4'-dodecyloxanilide; cyanoacrylates, such as ethyl-α-cyano-β, β-diphenylacrylate and methyl-2-cyano-3-methyl-3-(p- methoxyphenyl)acrylate; and a variety of metal salts and metal chelates, particularly salts and chelates of nickel and chromium.

In cases where any of the above-exemplified ultraviolet absorbers is used, it is used such that, when the photostabilizer masterbatch of the present invention is incorporated into a synthetic resin, the ultraviolet absorber is added in an amount of preferably 0.001 to 5 parts by mass, more preferably 0.01 to 0.5 parts by mass, with respect to 100 parts by mass of the synthetic resin.

Examples of the hindered amine-based photostabilizer other than the (B) hindered amine compound include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl).di(tridecyl)-1,2,3,4-butanetetracarboxylate, bis(1,2,2,6,6-pentamethyl-4-piperidyl).di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazin e polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-yl]aminoundecane, 1,6,11-tris[2,4-bis(N-butyl-N-(1,2,2,6,6-pentamethyl-4-piperidyl)amino)-s-triazine-6-yl]amino undecane, bis{4-(1-octyloxy-2,2,6,6-tetramethyl)piperidyl}decanedionate, bis{4-(2,2,6,6-tetramethyl-1-undecyloxy)piperidyl)carbonate, and TINUVIN® NOR™ 371 (former trade name, manufactured by BASF Ltd.).

In cases where any of the above-exemplified hindered amine-based photostabilizers other than the (B) hindered amine compound is used, it is used such that, when the photostabilizer masterbatch of the present invention is incorporated into a synthetic resin, the hindered amine-based photostabilizer is added in an amount of preferably 0.01 to 10 parts by mass, more preferably 0.05 to 0.5 parts by mass, with respect to 100 parts by mass of the synthetic resin.

Examples of the nucleating agent include metal carboxylates such as sodium benzoate, aluminum 4-tert-butylbenzoate, sodium adipate and 2-sodium-bicyclo[2.2.1]heptane-2,3-dicarboxylate; metal phosphates, such as sodium-bis(4-tert-butylphenyl)phosphate, sodium-2,2'-methylene-bis(4,6-di-tert-butylphenyl)phosphate and lithium-2,2'-methylene-bis(4,6-di-tert-butylphenyl)phosphate; polyhydric alcohol derivatives, such as dibenzylidene sorbitol, bis(methylbenzylidene)sorbitol, bis(3,4-dimethylbenzylidene)sorbitol, bis (p-ethylbenzylidene)sorbitol and bis(dimethylbenzylidene) sorbitol; and amide compounds, such as N,N',N''-tris[2-methylcyclohexyl]-1,2,3-propane tricarboxamide, N,N',N'''-tricyclohexyl-1,3,5-benzene tricarboxamide, N,N'-dicyclohexyl-naphthalene dicarboxamide and 1,3,5-tri(2,2-dimethylpropaneamide)benzene.

In cases where any of the above-exemplified nucleating agents is used, it is used such that, when the photostabilizer masterbatch of the present invention is incorporated into a synthetic resin, the nucleating agent is added in an amount of preferably 0.001 to 5 parts by mass, more preferably 0.005 to 0.5 parts by mass, with respect to 100 parts by mass of the synthetic resin.

Examples of the flame retardant include aromatic phosphates, such as triphenyl phosphate, tricresyl phosphate, trixylenyl phosphate, cresyldiphenyl phosphate, cresyl-2,6-dixylenyl phosphate, resorcinol-bis(diphenylphosphate), (1-methylethylidene)-4,1-phenylene tetraphenyldiphosphate, 1,3-phenylene-tetrakis(2,6-dimethylphenyl)phosphate, ADK STAB FP-500 (trade name, manufactured by ADEKA Corporation), ADK STAB FP-600 (trade name, manufactured by ADEKA Corporation) and ADK STAB FP-800 (trade name, manufactured by ADEKA Corporation); phosphonates, such as divinyl phenylphosphonate, diallyl phenylphosphonate and (1-butenyl) phenylphosphonate; phosphinates, such as phenyl diphenylphosphinate, methyl diphenylphosphinate and 9,10-dihydro-9-oxa-10-phosphaphenanthlene-10-oxide derivatives; phosphazene compounds, such as bis(2-allylphenoxy)phosphazene and dicresylphosphazene; phosphorus-based flame retardants, such as melamine phosphate, melamine pyrophosphate, melamine polyphosphate, melam polyphosphate, ammonium polyphosphate, piperazine phosphate, piperazine pyrophosphate, piperazine polyphosphate, phosphorus-containing vinylbenzyl compounds and red phosphorus; metal hydroxides, such as magnesium hydroxide and aluminum hydroxide; and bromine-based flame retardants, such as brominated bisphenol A-type epoxy resins, brominated phenol novolac-type epoxy resins, hexabromobenzene, pentabromotoluene, ethylene-bis(pentabromophenyl), ethylene-bis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromobisphenol A-type dimethacrylate, pentabromobenzyl acrylate and brominated styrene. These flame retardants are preferably used in combination with a drip inhibitor such as a fluorocarbon resin, and/or a flame retardant aid such as a polyhydric alcohol or hydrotalcite.

In cases where any of the above-exemplified flame retardants is used, it is used such that, when the photostabilizer masterbatch of the present invention is incorporated into a synthetic resin, the flame retardant is added in an amount of preferably 0.01 to 50 parts by mass, more preferably 10 to 30 parts by mass, with respect to 100 parts by mass of the synthetic resin.

The lubricant is added for the purposes of imparting the surface of the resulting molded article with lubricity and improving the damage-preventing effect. Examples of the lubricant include unsaturated fatty acid amides, such as oleic acid amide and erucic acid amide; and saturated fatty acid amides, such as behenic acid amide and stearic acid amide. These lubricants may be used individually, or two or more thereof may be used in combination.

In cases where any of the above-exemplified lubricants is used, it is used such that, when the photostabilizer masterbatch of the present invention is incorporated into a synthetic resin, the lubricant is added in an amount of preferably 0.01 to 2 parts by mass, more preferably 0.1 to 0.5 parts by mass, with respect to 100 parts by mass of the synthetic resin.

Examples of a filler other than the above-described silicas include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fibers, clays, dolomite, alumina, potassium titanate whiskers, wollastonite and fibrous magnesium oxysulfate, and any of these fillers can used by appropriately selecting the particle size (the fiber diameter, fiber length and aspect ratio in the case of a fibrous filler). Further, the filler to be used can be subjected to a surface treatment as required.

In cases where any of the above-exemplified fillers is used, it is used such that, when the photostabilizer masterbatch of the present invention is incorporated into a synthetic resin, the filler is added in an amount of preferably 0.01 to 80 parts by mass, more preferably 1 to 50 parts by mass, with respect to 100 parts by mass of the synthetic resin.

Examples of the metallic soap include fatty acid metal salts having 1 to 40 carbon atoms. Examples of the fatty acid of the fatty acid metal salts include saturated fatty acids, such as acetic acid, propionic acid, butyric acid, valeric acid, isovaleric acid, caproic acid, enanthic acid, caprylic acid, pelargonic acid, capric acid, 2-ethylhexanoic acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, cerotic acid, montanoic acid and melissic acid; linear unsaturated fatty acids, such as 4-decenoic acid, 4-dodecenoic acid, palmitoleic acid, α-linolenic acid, linoleic acid, γ-linolenic acid, stearidonic acid, petroselinic acid, oleic acid, elaidic acid, vaccenic acid, eicosapentaenoic acid, docosapentaenoic acid and docosahexaenoic acid; and aromatic fatty acids such as trimesic acid. In the present invention, aliphatic groups having 7 to 21 carbon atoms are preferred, and saturated fatty acids such as myristic acid, stearic acid and 12-hydroxystearic acid are particularly preferred.

Examples of the metal of the fatty acid metal salts include alkali metals, magnesium, calcium, strontium, barium, titanium, manganese, iron, zinc, silicon, zirconium, yttrium, barium, and hafnium. Thereamong, alkali metals such as sodium, lithium and potassium can be particularly preferably used.

In cases where any of the above-exemplified metallic soaps is used, it is used such that, when the photostabilizer masterbatch of the present invention is incorporated into a synthetic resin, the metallic soap is added in an amount of preferably 0.001 to 10 parts by mass, more preferably 0.01 to 5 parts by mass, with respect to 100 parts by mass of the synthetic resin.

The hydrotalcite is a complex salt compound which is known as a natural or synthetic product and composed of magnesium, aluminum, hydroxyl groups, a carbonate group and arbitrary crystal water, and examples thereof include hydrotalcites in which some of the magnesium or aluminum atoms are substituted with other metal such as an alkali metal or zinc; and hydrotalcites in which the hydroxyl group(s) and/or carbonate group is/are substituted with other anionic group(s). Specifically, for example, hydrotalcites represented by the following Formula (3) in which a metal is substituted with an alkali metal and, as Al—Li hydrotalcites, compounds represented by the following Formula (4) can also be used.

$$Mg_{x1}Zn_{x2}Al_2(OH)_{2(x1+x2)+4}(CO_3) \cdot pH_2O \quad (3)$$

(wherein, x1 and x2 each represent a number that satisfies the conditions represented by the following equations; and p represents 0 or a positive number:

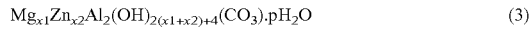

$$[Li_{1/3}Al_{2/3}(OH)_2] \cdot [A^{q-}{}_{1/3q} \cdot pH_2O] \quad (4)$$

(wherein, $A^{q-}$ represents an anion having a valence of q; and p represents 0 or a positive number)

Further, the carbonate anion in the above-described hydrotalcites may be partially substituted with other anion.

In these hydrotalcites, the crystal water may be dehydrated, and the hydrotalcites may be coated with, for example, a higher fatty acid such as stearic acid, a higher fatty acid metal salt such as alkali metal oleate, a metal organic sulfonate such as alkali metal dodecylbenzenesulfonate, a higher fatty acid amide, a higher fatty acid ester, or a wax.

The hydrotalcite may be a naturally-occurring or synthetic hydrotalcite. Examples of a method of synthesizing such a compound include known methods that are described in Japanese Patent Publication (Kokoku) No. S46-2280, Japanese Patent Publication (Kokoku) No. S50-30039, Japanese Patent Publication (Kokoku) No. S51-29129, Japanese Patent Publication (Kokoku) No. H3-36839, Japanese Unexamined Patent Application Publication No. S61-174270, Japanese Unexamined Patent Application Publication No. H5-179052 and the like. Further, the above-exemplified hydrotalcites can be used without any restriction on the crystal structure, crystal particle and the like.

In cases where any of the above-exemplified hydrotalcites is used, it is used such that, when the photostabilizer masterbatch of the present invention is incorporated into a synthetic resin, the hydrotalcite is added in an amount of preferably 0.001 to 5 parts by mass, more preferably 0.05 to 3 parts by mass, with respect to 100 parts by mass of the synthetic resin.

Examples of the above-described antistatic agent include cationic antistatic agents, such as fatty acid quaternary ammonium ion salts and polyamine quaternary salts; anionic antistatic agents, such as higher alcohol phosphates, higher alcohol EO adducts, polyethylene glycol fatty acid esters, anionic alkyl sulfonates, higher alcohol sulfates, higher alcohol ethylene oxide adduct sulfates and higher alcohol ethylene oxide adduct phosphates; nonionic antistatic agents, such as polyhydric alcohol fatty acid esters, polyglycol phosphates and polyoxyethylene alkyl allyl ethers; and amphoteric antistatic agents, such as amphoteric alkyl betaines (e.g., alkyldimethylamino acetic acid betaines) and imidazoline-type amphoteric activators. These antistatic agents may be used individually, or two or more thereof may be used in combination.

In cases where any of the above-exemplified antistatic agents is used, it is used such that, when the photostabilizer masterbatch of the present invention is incorporated into a synthetic resin, the antistatic agent is added in an amount of preferably 0.03 to 2 parts by mass, more preferably 0.1 to 0.8 parts by mass, with respect to 100 parts by mass of the synthetic resin.

As the above-described pigment, a commercially available pigment can be used as well, and examples thereof include PIGMENT RED 1, 2, 3, 9, 10, 14, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240 and 254; PIGMENT ORANGE 13, 31, 34, 36, 38, 43, 46, 48, 49, 51, 52, 55, 59, 60, 61, 62, 64, 65 and 71; PIGMENT YELLOW 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180 and 185; PIGMENT GREEN 7, 10 and 36; PIGMENT BLUE 15, 15:1, 15:2, 15:3, 15:4, 15:5, 15:6, 22, 24, 56, 60, 61, 62 and 64; and PIGMENT VIOLET 1, 19, 23, 27, 29, 30, 32, 37, 40 and 50.

The apparatus used for producing the photostabilizer masterbatch of the present invention may be any apparatus as long as it is capable of carrying out the first mixing step of mixing (A) a wet silica and (B) a hindered amine compound represented by the Formula (1) and the second mixing step of further adding and mixing (C) a dry silica with the resulting mixture of the (A) wet silica and the (B) hindered amine compound. Particularly, an apparatus equipped with a stirring function and a heating/cooling function is preferred.

Examples of a synthetic resin stabilized by the photostabilizer masterbatch of the present invention include thermoplastic resins, thermosetting resins, crystalline resins, amorphous resins, biodegradable resins, non-biodegradable resins, synthetic resins, naturally-occurring resins, general-purpose resins, engineering resins, and polymer alloys.

The synthetic resin stabilized by the photostabilizer masterbatch of the present invention may be any of, for example, thermoplastic resins, such as α-olefin homopolymers or copolymers (e.g., polypropylene, low-density polyethylene, linear low-density polyethylene, high-density polyethylene, polybutene-1, poly-3-methylpentene, poly-4-methylpentene and ethylene-propylene copolymers), copolymers of these α-olefins with a polyunsaturated compound (e.g., conjugated diene or unconjugated diene), acrylic acid, methacrylic acid, vinyl acetate or the like, linear polyesters and acid-modified polyesters (e.g., polyethylene terephthalate, polyethylene terephthalate-isophthalate, polyethylene terephthalate-p-hydroxybenzoate and polybutylene terephthalate), biodegradable resins (e.g., aliphatic polyesters), liquid-crystal polyesters, polyamides (e.g., polycaprolactam and polyhexamethylene adipamide), liquid-crystal polyamides, polyimides, polystyrenes, copolymers (e.g., acrylonitrile-styrene copolymer (AS) resins, acrylonitrile-butadiene-styrene copolymer (ABS) resins, methyl methacrylate-butadiene-styrene copolymer (MBS) resins and heat-resistant ABS resins) that are composed of styrene and/or α-methylstyrene with other monomer(s) (e.g., maleic anhydride, phenylmaleimide, methyl methacrylate, butadiene or acrylonitrile), halogen-containing resins (e.g., polyvinyl chloride, polyvinylidene chloride, chlorinated polyethylene, chlorinated polypropylene, polyvinylidene fluoride, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers and vinyl chloride-cyclohexylmaleimide copolymers), (meth) acrylate polymers (e.g., methyl (meth)acrylate, ethyl (meth) acrylate and octyl (meth)acrylate), polyether ketones, polyvinyl acetates, polyvinyl formals, polyvinyl butyrals, polyvinyl alcohols, linear or branched polycarbonates, petroleum resins, coumarone resins, polyphenylene oxides, polyphenylene sulfides, thermoplastic polyurethanes and cellulose-based resins; thermosetting resins, such as epoxy resins, phenol resins, urea resins, melamine resins, unsaturated polyester resins and thermosetting polyurethanes; naturally-occurring resins, such as natural rubbers, microorganism-produced aliphatic polyesters (e.g., 3-hydroxybutyrate), microorganism-produced aliphatic polyamides, starch, cellulose, chitin/chitosan, and gluten/gelatin; general-purpose resins; engineering resins; and polymer alloys. The term "polymer alloy" used herein refers to a multi-component polymer system which may be a block polymer obtained by copolymerization or a polymer blend obtained by mixing or the like.

The synthetic resin may also be an elastomer (e.g., an isoprene rubber, a butadiene rubber, a butadiene-styrene copolymer rubber, a butadiene-acrylonitrile copolymer rubber, an acrylonitrile-butadiene-styrene copolymer rubber, a copolymer rubber of ethylene and an α-olefin such as propylene or butene-1, or a ternary copolymer rubber of ethylene-α olefin and a non-conjugated diene such as ethylidene norbornene or cyclopentadiene), an α-olefin elastomer, a silicon resin, or an alloy or blend of any of these resins and/or an elastomer and a rubber.

The expression of the stabilization effect of the synthetic resin is variable depending on, for example, the stereoregularity, the specific gravity, the type of polymerization catalyst, the presence/absence and extent of removal of the polymerization catalyst, the degree of crystallization, the polymerization conditions such as temperature and pressure, the crystal type, the size of lamellar crystals determined by X-ray small-angle scattering, the aspect ratio of crystals, the solubility in an aromatic or aliphatic solvent, the solution viscosity, the melt viscosity, the average molecular weight, the degree of molecular weight distribution, the number of peaks in the molecular weight distribution, whether the copolymer thereof is a block or random copolymer, and the blending ratio of each monomer; however, the present invention can be applied to any synthetic resin selected.

The synthetic resin is preferably a polyolefin resin since it allows a prominent photostabilization effect to be exerted when the photostabilizer masterbatch of the present invention is added. Examples of the polyolefin resin include α-olefin homopolymers or copolymer, such as polypropylene, low-density polyethylene, linear low-density polyethylene, high-density polyethylene, polybutene-1, poly-3-methylpentene, poly-4-methylpentene and ethylene-propylene copolymers.

The method of incorporating the photostabilizer masterbatch of the present invention into the synthetic resin is not particularly restricted, and any known technique for incorporating a resin additive can be employed. Examples thereof include a method of melt-kneading a mixture of the photostabilizer masterbatch of the present invention and the synthetic resin using a processing equipment such as an extruder; and a method of mixing and granulating the synthetic resin and other resin additive(s), mixing the resultant with the photostabilizer masterbatch of the present invention and then molding the resulting mixture. The type of the processing machine to be used, the processing temperature, the post-processing cooling conditions and the like are also not particularly restricted, and such conditions can be selected as appropriate such that the resulting resin has physical properties that are suitable for the intended use. Further, the photostabilizer masterbatch of the present invention can be incorporated into the synthetic resin by itself or after being mixed with other additive(s), and the resultant can be subsequently molded.

When the photostabilizer masterbatch of the present invention is incorporated into the synthetic resin, the photostabilizer masterbatch of the present invention is preferably incorporated such that the (B) hindered amine compound is added in an amount of 0.01 to 10 parts by mass, preferably 0.1 to 1 parts by mass, with respect to 100 parts by mass of the synthetic resin. When the amount of the hindered amine compound is less than this range, a required stabilization effect may not be imparted to the synthetic resin, whereas when the amount of the hindered amine compound is greater than this range, not only an effect of increasing the added amount cannot be obtained but also the effects of the silicas contained in the photostabilizer masterbatch of the present invention may be enhanced and the physical properties of the synthetic resin may consequently be deteriorated.

The use of a synthetic resin composition comprising the photostabilizer masterbatch of the present invention is not particularly restricted, and the synthetic resin composition can be made into a film, a sheet or a molded article by known extrusion molding, injection molding, hollow molding, blow molding or the like to be used in automobile parts, building materials, agricultural materials, packaging materials, miscellaneous daily goods, toys and the like.

EXAMPLES

The present invention will now be described by way of examples and comparative examples thereof. The present invention is, however, not restricted to the following Examples and the like by any means.

The details of the silicas used in the following Examples are shown in Table 1 below. In Table 1 below, the average particle size of each silica produced by a wet process is an actually measured value of the 50% cumulative particle diameter which was obtained in accordance with ISO 13320 by measuring the volume particle size distribution by laser diffraction while ultrasonically dispersing a mixture obtained by adding the subject silica to water. Further, the area-average particle size of the silica produced by a dry process is a theoretical value calculated by applying a BET method to a nitrogen adsorption isotherm at the liquid nitrogen temperature.

TABLE 1

| | Production method | Manufacturer and trade name | Average particle size [μm] |
|---|---|---|---|
| Silica A | wet process | CARPLEX ® #80 (trade name, manufactured by DSL Japan, Co., Ltd.) | 15 |
| Silica B | dry process | AEROSIL ® 130 (trade name, manufactured by Nippon Aerosil Co., Ltd.) | 0.02 |
| Silica C | wet process | CARPLEX ® CS-7 (trade name, manufactured by DSL Japan, Co., Ltd.) | 6.0 |
| Silica D | wet process | CARPLEX ® FPS-1 (trade name, manufactured by DSL Japan, Co., Ltd.) | 7.0 |

Examples 1 to 3 and Comparative Examples 1 to 7

(Production of Photostabilizer Masterbatches)

After heat-melting a hindered amine compound (HALS-1), which is a mixture of 2,2,6,6-tetramethylpiperidin-4-yl stearate and 2,2,6,6-tetramethylpiperidin-4-yl palmitate, at 55° C. in advance, the thus heat-melted hindered amine compound was stirred at 40° C. for 20 minutes along with the respective silica(s) in accordance with each formulation of the first blending shown in Table 2 below using an FM mixer (Model FM-20, manufactured by Nippon Coke & Engineering Co., Ltd.). Thereafter, in accordance with each formulation of the second blending shown in Table 2 below, the respective silica was further added, and the resultant was stirred at 40° C. for 20 minutes to produce each photostabilizer masterbatch. The thus obtained photostabilizer masterbatches were each subjected to the following evaluations.
(Evaluation of Blocking Resistance)

The thus obtained photostabilizer masterbatches were each filled into a cylindrical container of 3.5 cm in diameter up to a height of 4 cm from the bottom, a 1 mm-thick disk was placed on the sample, and a 1-kg weight was set on the disk. The resultant was subjected to 5 cycles of 2-hour heating at 60° C. and 2-hour cooling at −10° C. and subsequently left to stand for 2 hours at normal temperature (25° C.). Thereafter, a load was gradually applied to the thus cylindrically formed photostabilizer masterbatch from the above, and the load (crushing force) at which the cylindrical shape collapsed was determined. The results thereof are shown in Table 2 below.

TABLE 2

| | First blending | | Second blending | | Evaluation results |
|---|---|---|---|---|---|
| | Filler HALS | Amount [parts by mass] | Filler | Amount [parts by mass] | Crushing force [N] |
| Example 1 | Silica A HALS-1 | 40.9 50 | Silica B | 9.1 | 63 |
| Example 2 | Silica C HALS-1 | 40.9 50 | Silica B | 9.1 | 70 |
| Example 3 | Silica D HALS-1 | 40.9 50 | Silica B | 9.1 | 67 |
| Comparative Example 1 | Silica B HALS-1 | 50 50 | — | — | could not evaluated[1] |
| Comparative Example 2 | Silica A HALS-1 | 50 50 | — | — | 97 |
| Comparative Example 3 | Silica B HALS-1 | 9.1 50 | Silica A | 40.9 | could not evaluated[2] |
| Comparative Example 4 | Silica A HALS-1 | 40.9 50 | Silica C | 9.1 | 115 |
| Comparative Examples | Silica A HALS-1 | 40.9 50 | Silica D | 9.1 | 111 |
| Comparative Example 6 | Silica A Silica B HALS-1 | 9.1 40.9 50 | — | — | 110 |
| Comparative Example 7 | HALS-1 PP[3] | 50 50 | — | — | 200 |

[1]In Comparative Example 1, no evaluation could be made since HALS-1 could not be impregnated into the silica B.
[2]In Comparative Example 3, no evaluation could be made since it was difficult to take out the masterbatch due to solidification during the second blending.
[3]PP: homopolypropylene having a melt flow rate of 8 g/10 min at 230° C.

According to Comparative Example 1, HALS could not be impregnated into the dry silica. Further, according to Comparative Examples 2 and 6, a satisfactory blocking-improving effect was not obtained without a two-step addition of silicas. Moreover, according to Comparative Example 3, when a dry silica and a wet silica were separately added in the first and second steps, respectively, no blocking-improving effect was obtained at all as compared to Comparative Example 6 where the dry silica and the wet silica were added simultaneously. Furthermore, according to Comparative Examples 4 and 5, the blocking-improving effect was also poor when a wet silica was added in the first step and another wet silica was further added in the second step.

Therefore, in the masterbatches of Comparative Examples 2 and 4 to 6, although the post-blocking crush was improved as compared to the masterbatch of Comparative Example 7 in which HALS was added to a polypropylene, the blocking-improving effect was not satisfactory.

In contrast, according to Examples 1 to 3, the photostabilizer masterbatches according to the present invention exhibited a prominent blocking-improving effect. From the above, it was confirmed that the photostabilizer masterbatch of the present invention has a largely improved ease of handling under an environment with notable temperature fluctuations. Furthermore, a molded article obtained by incorporating the photostabilizer masterbatch of the present invention into a synthetic resin and molding the resultant can exhibit the functions of a hindered amine compound represented by the Formula (1).

The invention claimed is:

1. A photostabilizer masterbatch obtained by adding and mixing 80 to 300 parts by mass of (B) a hindered amine compound represented by the following Formula (1) with respect to 100 parts by mass of (A) a silica produced by a wet process and subsequently further adding and mixing 5 to 50 parts by mass of (C) a silica produced by a dry process:

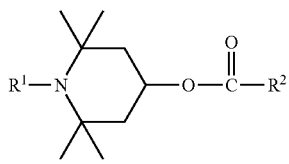
(1)

(wherein, $R^1$ represents a hydrogen atom, a hydroxy group, an alkyl, hydroxyalkyl, alkoxy or hydroxyalkoxy group having 1 to 30 carbon atoms, or an oxy radical; and $R^2$ represents an alkyl group having 1 to 30 carbon atoms, an alkenyl group having 2 to 30 carbon atoms, or a group represented by the following Formula (2))

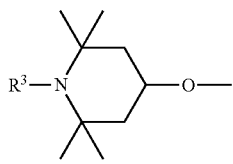
(2)

(wherein, $R^3$ represents the same as $R^1$ in said Formula (1)).

2. The photostabilizer masterbatch according to claim 1, wherein said (A) silica produced by a wet process has a volume-average particle size in a range of 0.1 to 100 μm.

3. The photostabilizer masterbatch according to claim 1, wherein said (C) silica produced by a dry process has an area-average particle size in a range of 1 to 100 nm.

4. A synthetic resin composition obtained by incorporating the photostabilizer masterbatch according to claim 1 into a synthetic resin such that the amount of said hindered amine compound of said component (B) is 0.01 to 10 parts by mass with respect to 100 parts by mass of said synthetic resin.

5. The synthetic resin composition according to claim 4, wherein said synthetic resin is a polyolefin resin.

6. A method of producing a photostabilizer masterbatch, said method comprising:
a first mixing step of adding and mixing 80 to 300 parts by mass of (B) a hindered amine compound represented by the following Formula (1) with respect to 100 parts by mass of (A) a silica produced by a wet process; and
a second mixing step of adding and mixing 5 to 50 parts by mass of (C) a silica produced by a dry process with the thus obtained mixture of said (A) silica produced by a wet process and said (B) hindered amine compound:

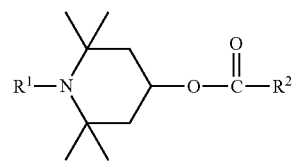
(1)

(wherein, $R^1$ represents a hydrogen atom, a hydroxy group, an alkyl, hydroxyalkyl, alkoxy or hydroxyalkoxy group having 1 to 30 carbon atoms, or an oxy radical; and $R^2$ represents an alkyl group having 1 to 30 carbon atoms, an alkenyl group having 2 to 30 carbon atoms, or a group represented by the following Formula (2))

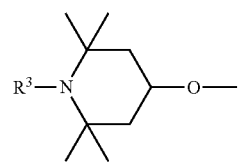
(2)

(wherein, $R^3$ represents the same as $R^1$ in said Formula (1)).

* * * * *